June 9, 1925.
L. D. TETER
1,541,198
SLIP CLUTCH FOR STONE GATHERERS
Original Filed Nov. 25, 1922
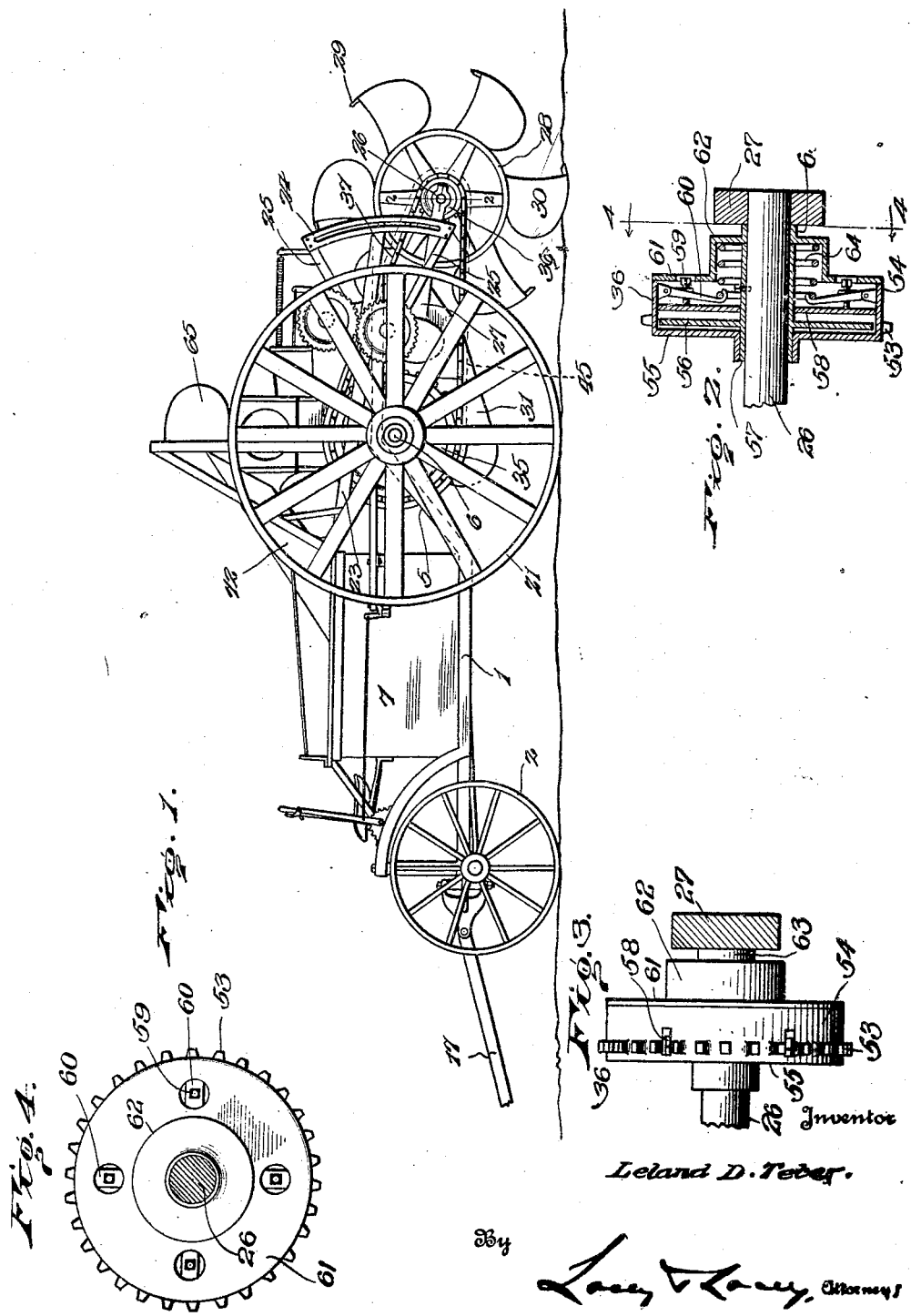

Patented June 9, 1925.

1,541,198

UNITED STATES PATENT OFFICE.

LELAND D. TETER, OF LIVINGSTONVILLE, NEW YORK.

SLIP CLUTCH FOR STONE GATHERERS.

Original application filed November 25, 1922, Serial No. 603,200. Divided and this application filed November 23, 1923. Serial No. 676,597.

*To all whom it may concern:*

Be it known that I, LELAND D. TETER, a citizen of the United States, residing at Livingstonville, in the county of Schoharie and State of New York, have invented certain new and useful Improvements in Slip Clutches for Stone Gatherers, of which the following is a specification.

This invention relates to stone-gatherers and has for its object the provision of means whereby, if an immovable obstruction be encountered, the stone-gathering members may yield to the impact and be momentarily arrested and automatically resume operation after the obstruction has been passed without damage to any of the working parts, the present application being a division of an application filed by me November 25, 1922, Serial No. 603,200.

In the accompanying drawings:

Figure 1 is a side elevation of a stone-gatherer embodying my present invention, Fig. 2 is an enlarged detail section on the line 2—2 of Fig. 1.

Fig. 3 is a side elevation;

Fig. 4 is an end elevation, the frame bar being omitted.

The frame of the stone-gatherer comprises sills 1 supported at their front ends by a suitable axle and steering wheels 2, a draft pole or tongue 17 being connected with the front axle. The sills carry a receptacle 7, of any approved form, for the gathered stones, and in rear of the receptacle extend upwardly, as at 5 to be carried by an axle 6 and furnish a support for the operating mechanism, driving wheels 21 being connected with the rear axle through escapement devices in a well-known manner.

Frame bars 23 are secured to the top of the receptacle 7 and extend rearwardly and downwardly therefrom to be joined to the rear ends of the main frame bars 5. To the rear extremities of the frame bars, I secure arcuate guiding plates 24, the ends of which are connected with the frame bars through braces 25 whereby the desired rigid construction will be effected. The gatherer is disposed between the guides 24 and between the rear extremities of the frame bars so that it may be lowered into operative position and raised into inoperative position without interference from any portion of the frame, and it is carried by a shaft 26 mounted in and carried by the rear ends of bars 27 which are pivotally mounted at their front ends upon the rear axle 6. The gatherer consists of a drum 28, which may be of any preferred detail construction, and teeth 29 of hooked or scoop-like form. These teeth are secured rigidly upon the drum in rows parallel with the axis of the same and, of course, rotate about the shaft 26 with the drum. In the working position illustrated in Fig. 1, the ends of the teeth in the several rows of teeth will successively penetrate the surface of the ground and pass under the stones so as to loosen and remove the same. Both end teeth of each row are provided with side plates or retainers 30 so that the stones cannot escape over the ends of the several gangs or baskets formed by the teeth. In advance of the drum, a chute 31 is supported by the gathering arms 27, and this chute is suitably constructed to permit the hooked teeth 29 to pass forwardly and downwardly and deposit the gathered stones in the chute down which the stones will roll to be taken up by elevator members 65. The elevator delivers the stones into an upper chute 72 through which they pass to the receptacle 7.

The gatherer is rotated through the action of a driving sprocket wheel 35 upon the rear axle 6, a sprocket 36 loose on the beater or gatherer shaft, and a chain 37 trained around the said sprockets. The sprocket 35 is loose upon the axle 6 and clutch mechanism, not shown, is provided to cause it to rotate with the axle when the gatherer is to operate. The sprockets 35 and 36 and the chain 37 are housed within a gear casing or dust guard indicated at 45 which is of proper form and dimensions to enclose all the said parts.

The sprocket 36 is constructed and mounted in such a manner that the gatherer may yield and be momentarily restrained from operating in the event that a large rock or other immovable obstruction is encountered. By referring to Fig. 2, (in which the clutch is shown open for the sake of clearness) it will be noted that the teeth 53, of the sprocket 36 are carried by a rim 54 extending laterally from a side plate or disk 55 so that one side of the sprocket is closed and the opposite side is open defining a pocket which fits about a disk 56 having a hub 57 which is secured to the gatherer shaft 26. Disposed within the rim 54 in such a manner that it must rotate therewith but may slide thereon toward or from the disk 56 is a plate 58 which encircles but is free of the hub member 57 and connected with said plate by bolts or screws 59 are a series of fingers 60 which are pivoted at their outer ends to the rim 54 adjacent the open side of the same. In Fig. 3 the plate 58 is shown as having peripheral portions engaging in longitudinal slots in the rim 54 whereby the plate will be constrained to rotate with the rim but may slide axially with respect thereto, but it will be understood that the specific form of engagement between the periphery of the plate and the rim is immaterial. The open side of the sprocket is covered by a plate 61 which is secured to the edge of the rim 54 and has a hub-like member 62 which extends through an opening in the side of the gear case 45 and fits loosely about the shaft 26. The said hub-like member is provided with a flange or collar 63 bearing against the bar or arm 27 so that it cannot move along the shaft 26. A coiled spring 64 is housed within the hub-like member 62 and bears against the outer end wall of the same and also against the inner free extremities of the fingers 60. Normally, the spring is expanded so that the fingers are pressed inwardly and the clutch plate 58 is thereby held in contact with the driving disk 56, it being understood that the screws or bolts 59 are threaded through the fingers and bear constantly at their inner ends against the clutch plate 58. The sprocket 36, of course, rotates continuously as long as the driving sprocket 35 is locked to the axle 6, and, when the clutch plate 58 is in its normal position bearing against and frictionally engaging the driving disk 56, the motion of the sprocket will be transmitted to the shaft 26 and the gatherers will be caused to travel around said shaft with the drum 28. Should a large rock or other immovable obstruction be encountered, the resistance thereby offered to the rotation of the gathering member will cause the plate 58 to slip upon the driving disk 56, overcoming the tension of the spring 64, so that momentarily no motion will be imparted to the gatherer shaft 26. As soon as the obstruction has been cleared, however, the normal tension of the spring 64 will assert itself and effect the desired clutching engagement between the plate 58 and the driving disk 56 so that the operation of the gatherer will be resumed.

Having thus described the invention, what is claimed as new is:

1. In a machine for the purpose set forth, the combination of a gatherer shaft, a driving disk fixed to said shaft, a hollow sprocket loose on the gathering shaft housing the said disk and having one side disposed adjacent said disk, means for imparting rotation to the sprocket, a clutch plate slidably fitted within and rotatable with the said sprocket, fingers pivoted upon the rim of the sprocket and connected with said clutch plate, and yieldable means acting on the inner free ends of the fingers for normally holding the clutch plate in engagement with the said driving disk.

2. In a machine for the purpose set forth, the combination of a gatherer shaft, a driving disk fixed to said shaft, a hollow sprocket loose on the gathering shaft housing said disk and having a radial web disposed adjacent the disk, means for rotating the sprocket, a clutch plate slidably fitted within the sprocket and rotatable therewith and arranged to bear against the driving disk, fingers pivoted on the rim of the sprocket and extending radially inward therefrom, a plate secured to the rim of the sprocket and covering the fingers and having a hub loosely encircling the gatherer shaft, a spring coiled around the shaft within said hub and having its ends bearing against the inner free ends of the fingers and the end of the hub respectively, and adjusting screws threaded through the fingers and engaging the clutch plate.

In testimony whereof I affix my signature.

LELAND D. TETER. [L. S.]